United States Patent

[11] 3,545,511

| | | |
|---|---|---|
| [72] | Inventor | Ernst Weichel<br>Bahnhofstrasse 1, Heiningen Ueber<br>Goeppingen, Germany |
| [21] | Appl. No. | 549,546 |
| [22] | Filed | May 12, 1966 |
| [45] | Patented | Dec. 8, 1970 |
| [32] | Priority | May 15, 1965 |
| [33] | | Germany |
| [31] | | No. W39156 |

[54] PROCESS AND APPARATUS FOR BREAKING UP A MASS OF PRODUCE
35 Claims, 8 Drawing Figs.

[52] U.S. Cl. .................................................. 146/78,
146/105, 146/167, 146/70
[51] Int. Cl. ........................................................ A01f 29/00,
B26d 4/22
[50] Field of Search .......................................... 241/6, 13,
30, 152; 143/33, 38, 40; 146/117, 78, 167, 105,
61, 70; 222/80, 408

[56] References Cited
UNITED STATES PATENTS
2,485,344 10/1949 Abbott ........................ 146/78

| | | | |
|---|---|---|---|
| 2,826,229 | 3/1958 | Necula ......................... | 146/78 |
| 2,835,297 | 5/1958 | Kochalski .................... | 146/167X |
| 2,923,337 | 2/1960 | Jouin ............................ | 146/78 |
| 2,650,745 | 9/1953 | Oberwortman .............. | 146/124X |

*Primary Examiner*—Willie G. Abercrombie
*Attorney*—Craig, Antonelli, Stewart & Hill ABSTRACT: Method and apparatus for intermediate storage and separation of a mass of stalk or leaf-type crops, including feeding the crops into a receptacle, the base of which is rotating and causes the mass to be set into rotation about a vertical axis, continuously severing from the peripheral rim of the mass layers or skeins of predetermined dimensions, the severing being effected at least in a substantially vertical cutting plane by means of a driven cutting element or a fixed cutting element, and removing the separated layers or skeins in a direction substantially tangential to the mass within the receptacle, said removal being effected, either continuously or batchwise, along the side of the vertical cutting element which faces away from the rotational axis of the mass within the receptacle.

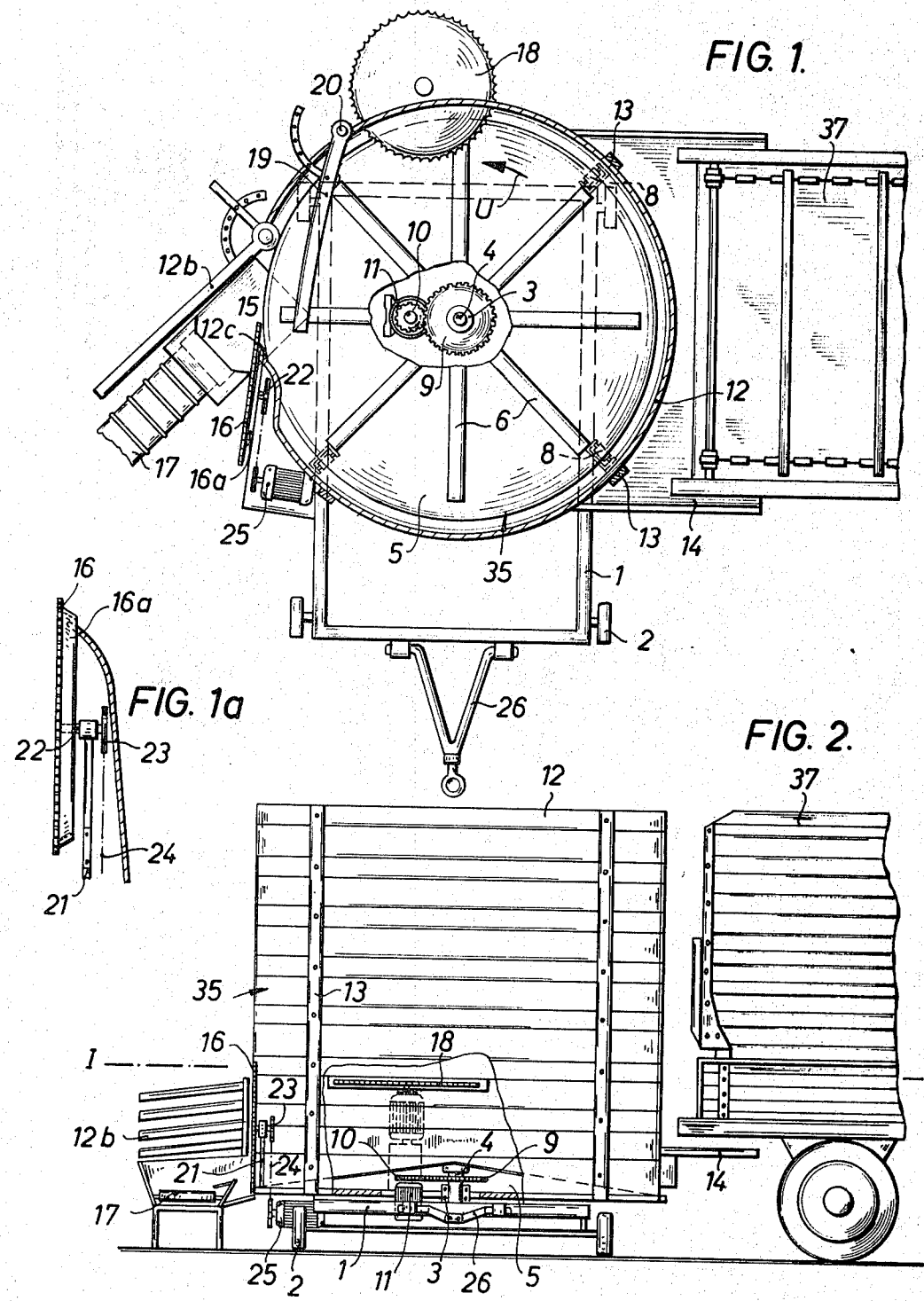

INVENTOR
ERNST WEICHEL

PROCESS AND APPARATUS FOR BREAKING UP A MASS OF PRODUCE

The present invention relates to process and apparatus for breaking up a heap of cereal or leaf crop by continuous extraction.

Since the introduction of loading machines, cereals and leaf crop, such as hay and beet leaf, may be loaded relatively rapidly in the field, transported to a farmyard and unloaded just as quickly, even, to some extent, by a single operator. This has, however, accentuated an old problem, since separate cartloads arriving at the farmyard in rapid succession cannot be broken up sufficiently rapidly and easily by hand and conveyed further or converted to chaff. This fact has been considered, sometimes without justification, a disadvantage of the loading wagons which have become known recently, although the task of continuously extracting cereal and leaf crop from heaps and conveying them further without manual labour has always been a hitherto unsolved problem. This problem existed not only with respect to long products which were loaded manually or by so-called front loaders, cartload loaders or by a loading wagon, but also when chaff was unloaded from so-called chaff unloading wagons having built-in feed and conveying mechanism. A further disadvantage is the need for supervision; it is not possible to empty a transporting wagon instantaneously, and too much time is wasted by the transporting wagon and its tractor by unproductive waiting at the unloading point. The problem is particularly difficult in the case of long stalked or unwieldy material, such as maize or sugar cane, where wagon loads are compactly interlaced heaps or masses and may be separated into individual portions only by laborious and time-wasting manual labour.

It is now realized that the general opinion that "long commodities" are more difficult to handle during unloading, subsequent transportation, storing, distribution and further extraction in the course of a so-called "chain of operations," than products which are chopped up, e.g. by a field chopper, before they are brought in, is founded on prejudice.

According to one feature of the present invention there is provided a process for gradually breaking up a heap or mass of cereal or leaf crop by continuous extraction, in which, whilst substantially maintaining the structure of the material, a skein is pared from the edge of a heap or mass lying on a rotating supporting surface by means of a cutting or sawing device which has a moving element and which determines the cross section of the skein, and is delivered externally for further processing.

According to another feature of the present invention apparatus for breaking up a heap or mass of cereal or leaf crop comprises a storage container, adapted to receive a heap or mass of cereal or leaf crop and having a turntable bottom adapted to be rotated about a vertical axis and a stationary wall substantially symmetrical about the rotational axis of the turntable and provided with a window aperture, and sawing or cutting means having movable elements extending into the interior of the container whereby to engage with a heap or mass therein to pare a continuous skein from the outer layer thereof, said window aperture determining the cross section of the skein and allowing the skein to pass from the interior of the container to the outside.

Thus the present invention provides a process and apparatus which, by relatively simply means and with the least possible attendance, can enable heaps or masses of long commodities to be separated rapidly an and reliably by continuous extraction, in that a skein substantially maintaining the structure of the material is pared from the edge of a heap rotating about a vertical axis and lying on a rotating supporting surface, the skein also being carried away to the outside for further processing.

The process and apparatus are not restricted solely to use in conjunction with loading wagons, but may be used anywhere where heaps or masses of cereals or leaf crops are to be broken up and distributed.

The invention will be further described by way of example with reference to embodiments illustrated in the accompanying drawings, in which:

FIG. 1 is a horizontal section taken along the line I–I of FIG. 2 of one embodiment of the invention;

FIG. 1a is a detail from FIG. 1 drawn to a larger scale;

FIG. 2 is a schematic end view of the embodiment of FIG. 1 and also showing a rear portion of a loading wagon in the unloading position;

Figure 3:
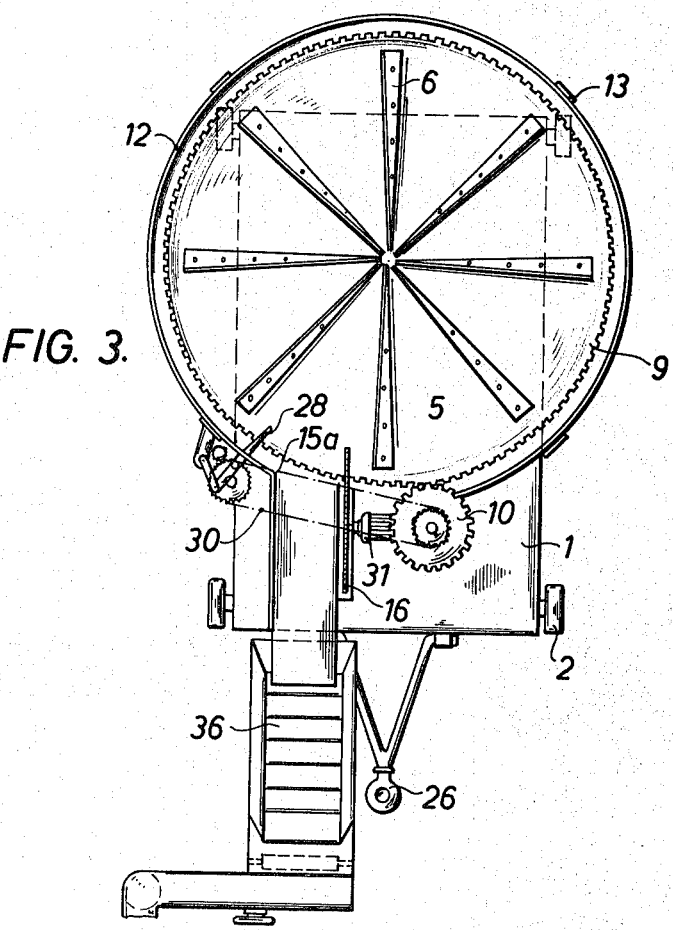
FIG. 3 is a section similar to FIG. 1 of another embodiment.

A vertical shaft 4 of a turntable 5 is mounted in a bearing 3 on a base frame 1, which, in the embodiment of FIGS. 1 to 4, is movable on rollers 2. The turntable 5 has radial ribs 6 and is constructed as a flattened cone. The outer rim of the turntable 5 is supported on the base frame 1 by support rollers 8. A toothed wheel 9 is attached beneath the turntable 5 and meshes with a pinion 10 of a preferably adjustable transmission such as a geared motor 11.

The turntable 5 forms the base of a cylindrical container which is open at the top and whose stationary wall comprises horizontal, bent slats, pipes, strips of sheet metal 12 and vertical struts 13. The struts 23 are arranged on the outside of the sheet metal strips 12, so that there are not vertical projections on the inside of the container wall 12, 13.

A portion of the container wall 12, 13 may be lower than the other portions, for example in the region of a horizontally arranged feed table 14 which can be loaded by a loading wagon or the like. The turntable 5 and the container wall 12, 13 together form a container 35.

A window aperture 15 is formed in the container wall 12, 13 on the side remote from the loading table 14, the aperture of this window being substantially in the shape of a rectangle. An adjustable flap 12b may be attached to that vertical edge of the rectangular window opening 15 lying first in the direction of rotation U of the turntable 5. At the other vertical edge a circular saw blade 16 extends partially through the container wall 12 and is mounted on a horizontal shaft 22 (in the embodiment of FIG. 1) and thus has a vertical sawing plane. The inwardly extending teeth of the saw blade 16 can therefore pare a skein from a heap or mass of cereal or leaf crop lying on the turntable 5 and moving along the inner wall of the container 12. The cross section of this skein depends on the height and the extent of penetration and the inclination of the saw blade 16 into the heap. When the vertical dimensions of this skein are determined by suitable means, the skein may travel outwardly through the container widow aperture 15, while the main portion of the heap lying on the rotating turntable 5 remains within the container wall 12. During rotation of the turntable 5, the outer layer of the most irregularly composed heap is caused to move outwardly by forming the turntable with an inclined surface so that it slides down such inclined surface, or by other known means, so that it moves along the inner wall 12 of the container in the circumferential direction.

In order to define the skein horizontally, the embodiment of FIG. 1 is provided with a second saw blade 18 whose vertical axis of rotation is disposed outside the container wall 12, a considerable portion of the area of the blade extending through an appropriate horizontal slit into the interior of the container 35 and thus into engagement with the heap of hay, or the like, rotating in the container. The saw blade 18 of this embodiment is arranged at a height which is substantially flush with the upper edge of the window aperture 15. The cross section of the skein pared from the heap and travelling out through the window aperture is, in this arrangement, dependent primarily upon the height at which the saw blade 18 rotates, and upon the vertical distance of the saw blade 16, which rotates about a horizontal axis, from the opposite vertical edge of the window aperture 15, or from the setting of the adjustable flap 12b. In the embodiment of FIGS. 1 and 2, a conveyor belt 17, on which the continuously flowing skein may be conveyed, is associated with the window aperture 15. In the embodiment of FIG. 3, a receiving trough 36 of a flower blower chopper or of a pneumatic conveyor can be directly or indirectly associated with the window aperture.

An adjustable deflector bar 19 is disposed behind the saw blade 18 as seen in the direction U, and is pivotable about a pivot 20 and may be fixed in any desired angular position. The deflector bar 19 corresponds to a so-called splitting wedge which is customary when circular saws are used for timber, and serves to loosen the skein from the main mass of the rotating heap, before the skein, separated by a horizontal cut of the saw blade 18, passes through the window aperture.

A tapered guide rim 16a of smaller diameter than the saw blade 16 is attached to the side of the blade 16 remote from the window aperture 15. The adjacent vertical edge 12c of the container wall 12 may terminate therebehind, so that no produce can clog at this point of impact.

In FIG. 1a, the shaft 22 is mounted on a holder 21 which is attached to the frame 1. The shaft 22 is driven by a belt pulley 23, a belt 24 and a motor 25. Alternatively, a chain drive can be provided. The part of the container wall 12 at the edge 12c prevents stalks from being wrapped around the driving elements.

A towing link 26 is located on the frame 1 in case the device 35 is to be used as a mobile vehicle and towed by, for example, a tractor. The apparatus may, of course, be set up in a stationary position, for example below the base of a loading wagon, or on the bottom of a storage pit.

The feed table 14 may be tiltable and made large enough to accommodate additional produce after the container 35 is filled, until space is again available within the container 35. Not only haulage vehicles 37 may be used for loading, but front loaders, scrapers, grabs, or other auxiliary means may be employed.

When the container 35 is loaded with a heap of cereals or leaf crop by a loading wagon 37, or by some other means, and the driving mechanism is put into operation to rotate the turntable 5 in the direction U, a heap or mass or produce lying on the rotating support surface of the turntable 5 is carried along the stationary container walls 12, wherein the radial, outward sliding of the produce is promoted, in the illustrated embodiment, by the slope of the conical base 5, the natural angle of repose of the heap, and centrifugal force, whilst the ribs 6 assist the movement of the heap in the circumferential direction.

As the heap brushes past the horizontally operating saw blade 18, a cut is made in the edge of the heap, this cut lying, in the illustrated embodiment, at the same height as the deflector 19, the the upper edge of the window aperture 15, and the upper edge of the vertically saw blade 16 to which runs the outer layer of the heap sliding along the wall 12 of the container 35. The saw blade 16 then cuts into the edge of the heap and pares a skein therefrom which runs outwardly between the saw blade 16 and the guide flap 12b (i.e. through the window aperture 15), somewhat tangentially to the container 35. According to the extent to which the heap settles during the course of the following rotations, and the extent to which new produce slides outwardly into the range of the two cutting devices 18, 16, after the skein has been pared off, a continuous skein of produce is pared from the heap and passed to the conveyor 17, until the container is practically empty. The speed of the conveyor 17 is preferably slightly higher than the circumferential speed of the outer edge of the turntable 5, but is not so high that the skein would be broken.

Figure 6B:
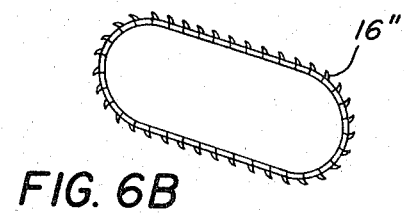
FIG. 6B is a schematic showing of a chain saw which may be substituted for the circular saw blade as depicted in FIG. 4.
Figure 6A:
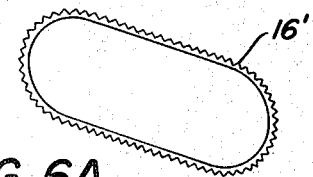
FIG. 6A is a schematic showing of a band saw which may be substituted for the circular saw blade depicted in FIG. 4.

Cutting chains 16'' as shown in FIG. 6B (as in motor saws), cutter bars (as in mowing machines), cutter bands (as in band saws 16' as shown in FIG. 6A), or other cutting devices may be used instead of the circular saw blades or cutting disks 16, 18.

As Additional mechanisms such as time switches and limit switches which may operate with mechanical or optical sensing elements may be provided in order to control the starting and stopping of the apparatus automatically in dependence upon the height of the heap or mass, the weight removed, or the instant of feed.

Figure 4:
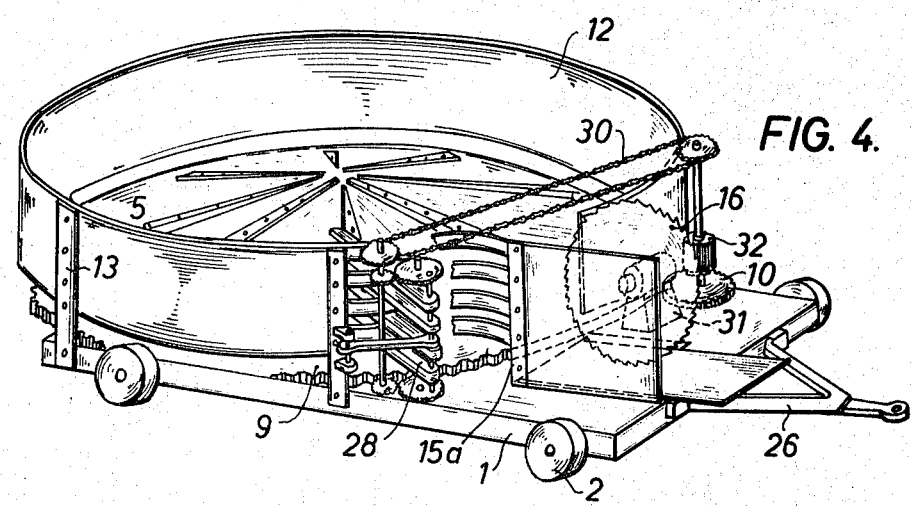
FIG. 4 is an inclined perspective view of the embodiment of FIG. 3 with a portion of the container wall omitted.

In the embodiment of FIGS. 3 and 4, conveying elements 28 are provided in the region of the vertical edge 15a of the window aperture opposite the saw blade 16, and are rotatable in the manner of a crank gear and have prongs which engage, from the outside, into the edge of the heap, and thus forcibly feed the produce to the saw blade 16. These conveying elements 28 are particularly suitable for use with produce of low density, such as hay. In this connection, the saw blade 16 may be arranged radially, or almost radially, relative to the axis of the turntable 5 as compared with the substantially tangential direction of the plane of the saw blade 16, in the embodiment of FIGS. 1 and 2. The conveying elements 28 are driven via chains 30, or the like, by a transmission or motor 32. In this embodiment, the same motor 32 serves to drive the turntable 5, which is provided with toothed rim meshing with the pinion 10. The saw saw blade 16 is mounted directly on the shaft of a motor 31. Particularly in this second embodiment it is sufficient to provide a single saw blade 16 whose axis of rotation may, perhaps, be inclined with respect to the horizontal.

Figure 5:
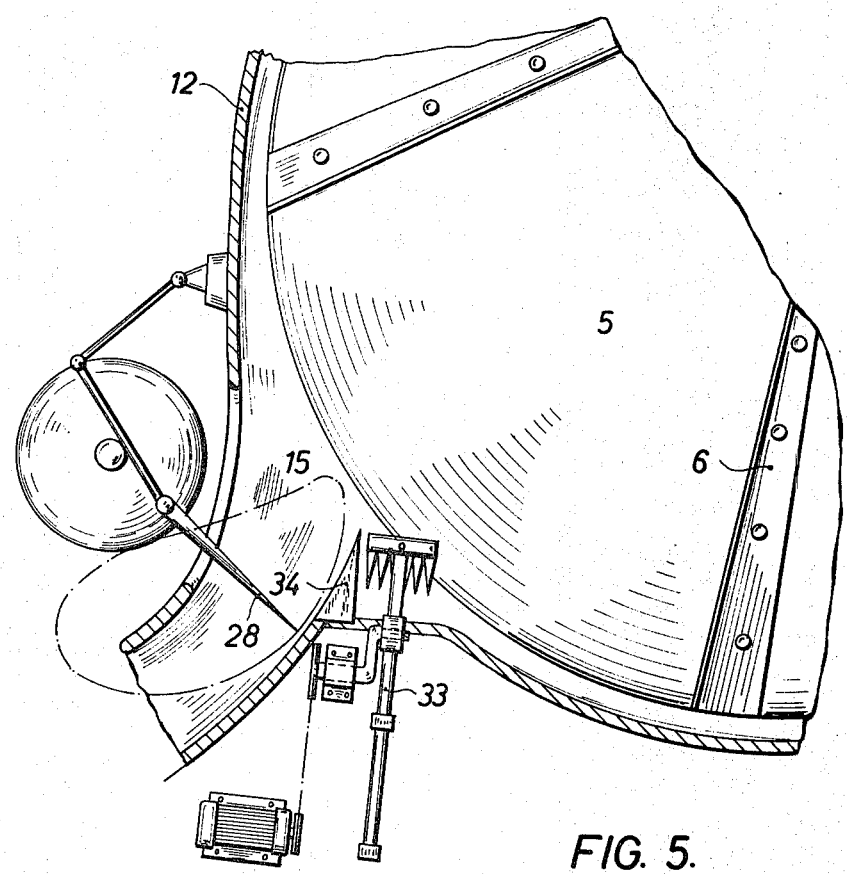
FIG. 5 is a partial section, approximately in the same horizontal plane as in FIGS. 1 and 3 of a third embodiment, drawn to a larger scale.

In the embodiment illustrated in FIG. 5, there is provided a rigid cutting blade 34 which extends in a preferably vertical plane. Here, in addition to the conveying elements 28, conveying elements 33 are also provided on the other broad side of th the butting blade, which conveying elements 33 may be constructed and controlled in a similar manner 33 to the conveying elements 28. Preferably the individual prongs of the conveying elements 28 and 33 are staggered with respect to each other. Since the two conveying elements 28 and 33 plunge into the produce in contrarotating directions and pull the produce apart in the region of the cutting edge 34, and conduct it along the cutting edge 34, the produce is separated by the cutting edge 34, which is preferably serrated, even when it is very tightly interlaced, so that the portion of the commodity located in the region of the window aperture 15 may be carried away laterally. This embodiment operates mainly at low speeds of the turntable 5 or of the conveying elements 28, 33, and ensures good operating reliability and security against accidents. It is especially suitable for processing short or precut material. The conveying elements 28 operate about a vertical axis, and the elements 33 operate about a horizontal axis.

The apparatus of the invention requires no manual labour for its operation, and requires to be checked only occasionally. This check may be carried out by the driver of the transport vehicle who delivers loads of the produce to the extracting device at fairly regular intervals of time. Despite the negligible susceptibility of to trouble it is recommended that emergency stop switches be provided for stopping the apparatus if a defect should occur on one of its elements.

Apparatus embodying the invention is advantageous in that it may be used to combine all known processes of the "long commodity" and "chopped commodity" processing in any desired sequence of the separate stages of the chain of operations. For example, the process of chopping all or individual batches of the harvest may be carried out at any desired stage of the chain of operations. This is a considerable advance, since by means of this apparatus the known chain of operations and processes may be fully mechanized or automated even in buildings and in factories of the most varied organization.

A further advantage lies in the fact that the apparatus of the invention may also be used to mix supplies of fodder from stores. For example, or in order to prepare a fodder ration for the next feed, specific weights and varieties of fodder may be placed on specific sectors of the turntable in a specific sequence, so that the pared skein of fodder coming out of the window aperture 15 has a desired composition which is suitable for conveying to the fodder table or manger. In this manner, labour and time can be saved in the farmyard.

It was previously very difficult to find and correctly deploy labour in the farmyard so that the cereal and leaf commodities brought in by transport vehicles e.g. loading wagons) could be cleared away or processed efficiently and at reasonable expense before the next cart load arrived. This difficulty can be substantially overcome by the invention. The container 35 may easily be dimensioned so that it can accommodate the loads of several transport vehicles 37 and, independently of newly arriving loads, transfer its contents to a conveyor 17 in a continuous stream, wherein the device serves, on the one hand, as an intermediate container 35 for a disordered heap moving inside it and, on the other hand, contains devices which are automatically and continuously fed from the heap or mass of produce and which, by simple and reliable means, effect the separation of the heap into easily handled skeins of produce to be transported.

I claim:

1. Apparatus for breaking up a mass of produce such as cereal or leaf crops, comprising:
   a storage container adapted to receive a mass of produce, said storage container having a turntable bottom adapted to be rotated about a substantially vertical axis, a stationary side wall substantially symmetrical about the rotational axis of the turntable bottom and having an outlet aperture therein;
   cutting means having at lest one movable element extending into the interior of said container to engage with a mass of produce therein, and means for driving said turntable and cutting means for paring a substantially continuous skein from the outer layer of a mass of produce inside the container and delivering it through said outlet aperture to outside said container; and
   in which said cutting means comprises two circular saws of which one has a substantially horizontal cutting plane, and the other has a substantially vertical cutting plane whereby a substantially rectangular section skein can be pared off and is operative in a plane inclined to the direction in which the skein is withdrawn.

2. Apparatus for breaking up a mass of produce such as cereal or leaf crops, comprising:
   a storage container adapted to receive a mass of produce, said storage container having a turntable bottom adapted to be rotated about a substantially vertical axis, a stationary side wall substantially symmetrical about the rotational axis of the turntable bottom and having an outlet aperture therein; and
   cutting means having at least one movable element extending into the interior of said container to engage with a mass of produce therein, and means for driving said turntable and cutting means for paring a substantially continuous skein from the outer layer of a mass of produce inside the container and delivering it through said outlet aperture to outside said container, including guide elements arranged in the vicinity of the outlet aperture for influencing the direction in which the skein is delivered from inside to outside said container.

3. Apparatus according to claim 2 in which said guide elements are adjustable.

4. Apparatus according to claim 3, in which said cutting means includes a fixed cutter blade with which at least one conveying means is associated such that said conveying means is adapted to force part of said mass of produce against at least one broad side of said blade.

5. Apparatus for breaking up a mass of produce such as cereal or leaf crops, comprising:
   a storage container adapted to receive a mass of produce, said storage container having a turntable bottom adapted to be rotated about a substantially vertical axis, a stationary side wall substantially symmetrical about the rotational axis of the turntable bottom and having an outlet aperture therein;
   cutting means having at least one movable element extending into the interior of said container to engage with a mass of produce therein, and means for driving said turntable and cutting means for paring a substantially continuous skein from the outer layer of a mass of produce inside the container and delivering it through said outlet aperture to outside said container, including conveying means in the region of said outlet aperture for assisting the movement of the skein in its delivery direction; and
   in which said cutting means includes a fixed cutter blade having two broad sides; said conveying means being associated with said cutting blade and adapted to force part of said mass of produce against the broad sides of said blade, the said conveying means being, on one side of said cutting blade, movable about vertical axes and on the other side movable about horizontal axes.

6. Apparatus for breaking up a mass of produce such as cereal or leaf crop, comprising:
   a storage container adapted to receive a mass of produce, said storage container having a turntable bottom adapted to be rotated about a substantially vertical axis, a stationary side wall substantially symmetrical about the rotational axis of the turntable bottom and having an outlet aperture therein; and
   cutting means having at least one movable element extending into the interior of said container to engage with a mass of produce therein, and means for driving said turntable and cutting means for paring a substantially continuous skein from the outer layer of a mass of produce inside the container and delivering it through said outlet aperture to outside said container, in which a device for further processing said produce is disposed behind the outlet aperture in the direction of delivery of the skein.

7. Apparatus according to claim 6 in which said device is a conveyor.

8. Apparatus according to claim 6 in which said device is a chopper.

9. Apparatus for breaking up a mass of produce such as cereal or leaf crops, comprising:
   a storage container adapted to receive a mass of produce, said storage container having a turntable bottom adapted to be rotated about a substantially vertical axis, a stationary side wall substantially symmetrical about the rotational axis of the turntable bottom and having an outlet aperture therein; and
   cutting means having at least one movable element extending into the interior of said container to engage with a mass of produce therein, and means for driving said turntable and cutting means for paring a substantially continuous skein from the outer layer of a mass of produce inside the container and delivering it through said outlet aperture to outside said container, in which said turntable bottom is raised towards its center.

10. Apparatus according to claim 9 in which the turntable is conical.

11. Apparatus for breaking up a mass of produce such as cereal or leaf crops, comprising:
   a storage container adapted to receive a mass of produce, said storage container having a turntable bottom adapted to be rotated about a substantially vertical axis, a stationary side wall substantially symmetrical about the rotational axis of the turntable bottom and having an outlet aperture therein; and
   cutting means having at least one movable element extending into the interior of said container to engage with a mass of produce therein, and means for driving said turntable and cutting means for paring a substantially continuous skein from the outer layer of a mass of produce inside the container and delivering it through said outlet aperture to outside said container, in which ribs are provided on the turntable bottom for pushing a mass of produce on the turntable bottom in the direction of rotation of the turntable bottom and urging it radially outwardly thereupon.

12. Apparatus for the intermediate storage and subsequent separation and handling of a mass of agricultural material in stalk or leaf form, comprising:
a storage container adapted to receive a mass of agricultural material, said storage container including a turntable bottom adapted for rotation about a substantially vertical axis and a stationary side wall disposed substantially symmetrically about the rotational axis of said turntable bottom and having an outlet aperture therein;
means for driving said turntable and imparting rotational motion thereto; and
cutting means, disposed in a substantially vertical plane in the region of the rear edge of said outlet aperture, viewed in the direction of rotation of said turntable, said cutting means being thus operative to sever a skein of predetermined dimensions from the periphery of the mass within said container and to effect the removal of said skein from said container to the outside through said outlet aperture.

13. Apparatus according to claim 12, wherein said cutting means includes a drive cutting element.

14. Apparatus according to claim 13, wherein said driven cutting element comprises a circular saw.

15. Apparatus according to claim 13, wherein said driven cutting element includes a stationary cutting element, and further comprising conveying means disposed within the region of at least one edge of said outlet aperture for assisting the movement of the skein in its delivery direction.

16. Apparatus according to claim 13, wherein said driven cutting element extends to a height approximately level with the top of said container.

17. Apparatus according to claim 15, wherein said cutting element extends to a height approximately level with the top of said container.

18. Apparatus according to claim 12, further comprising slitting means, disposed in a substantially horizontal plane, said slitting means extending through a slot in said side wall, into said container to a predetermined extent, at a location in advance of said cutting means when viewed in the direction of rotation of said turntable, and at a height greater than that of the lower edge of said outlet aperture.

19. Apparatus according to claim 18, wherein said slitting means includes a driven cutting element.

20. Apparatus according to claim 19, wherein said driven cutting element comprises a circular saw.

21. Apparatus according to claim 19, further comprising a conveyor belt extending tangentially relative to said turntable and arranged at said outlet aperture alined alongside one side of said cutting means which faces away from said turntable.

22. Apparatus according to claim 12, wherein said turntable is constructed in the form of a conical surface with the apex thereof corresponding to the vertical rotational axis of said turntable.

23. Apparatus according to claim 13, wherein portions of said side wall adjacent to said outlet aperture are constructed in the form of deflecting members.

24. Apparatus according to claim 21, wherein said cutting element is arranged in a plane disposed obliquely relative to the direction of motion of said turntable in the region of said outlet aperture.

25. Apparatus according to claim 15, wherein said conveying means include a first group, positioned near one side of said outlet aperture, said first group being adapted for motion about a vertical axis of rotation, and a second group, positioned near the opposite side of said outlet aperture, and being adapted for motion about a horizontal axis of rotation.

26. Apparatus according to claim 15, wherein said conveying means are positioned near both sides of said outlet aperture and are adapted for motion about vertical axes of rotation.

27. Apparatus according to claim 21, further comprising a comminuting device positioned to be operative upon a skein of material removed from said outlet aperture by said conveyor belt.

28. Apparatus according to claim 12, wherein said side wall of said container has a portion thereof adapted for removal, to provide an inlet opening for said container.

29. Apparatus according to claim 28, further comprising a feed table cooperating with said inlet opening of said container, said inlet opening and feed table being located approximately opposite said outlet aperture.

30. Apparatus according to claim 29, wherein said feed table includes means for pivoting about a horizontal axis.

31. Apparatus according to claim 29, wherein said feed table includes conveyor means for imparting motion to material deposited thereon.

32. Apparatus according to claim 22, wherein said turntable is provided with entrainment members affixed thereto.

33. Apparatus according to claim 13, wherein said cutting element comprises a band saw.

34. Apparatus according to claim 13, wherein said cutting element comprises a cutting chain.

35. Apparatus according to claim 15, wherein said cutting element comprises a knife bar.